Sept. 25, 1962 D. V. RIDGEWAY 3,055,973

MEANS FOR EFFECTING REGISTRATION IN COLOUR TELEVISION PROJECTION SYSTEMS

Filed Aug. 28, 1957 2 Sheets-Sheet 1

Inventor
D.V. RIDGEWAY
By
Holcombe, Wetherill & Brisebois
Attorneys

Inventor
D.V. RIDGEWAY
By
Holcomb, Wetherill & Brisebois
Attorneys 3,055,973

MEANS FOR EFFECTING REGISTRATION IN COLOUR TELEVISION PROJECTION SYSTEMS

Denis V. Ridgeway, Cambridge, England, assignor to Pye Limited, Cambridge, England, a British company Filed Aug. 28, 1957, Ser. No. 680,818
Claims priority, application Great Britain Aug. 30, 1956
3 Claims. (Cl. 178—5.4)

The present invention relates to projection systems for colour television and more particularly to means for attaining registration of the individual colour components so that the picture which is built up upon the screen from individual colour component images may be clear and not suffer from colour fringing.

In apparatus which is conventionally used in colour television projection, if the position of one picture element in a particular colour is required to be moved relative to the same picture element in the other colours the movement may be obtained by a suitable modification of the current flowing in the appropriate deflection coils of the various cathode-ray tubes and this arrangement is the normal one adopted in known projection apparatus. This shift is relatively easy to carry out per se since it merely involves the adjustment of the potentiometer, but if the position of the picture elements is dependent upon some external equipment such as a potentiometer it is naturally essential that the potentiometers associated with each colour control should have exactly the same characteristics so far as temperature stability is concerned and further that the current stability of the whole system should be of a high order. However it must be borne in mind that the equipment for adjusting the current conditions in a deflection coil is not usually a simple potentiometer but generally involves equipment having capacity and inductance, in order to adjust the relative amplitude, whereby the difficulties of matching and obtaining relative stability are greatly increased. It is the more specific object of the present invention to remedy these defects and produce simple and convenient means for effecting registration.

According to the invention means are provided for obtaining mechanical adjustment of the colour component that is incorrect so as to provide the registration required. Mechanical adjustments of the various components are provided so that the picture elements of the different colours may be registered precisely relatively to each other in respect of position, size and electrical focus. It is also arranged that the scanning currents be common by connecting the three sets of deflection coils and the three sets of focus coils in series and this ensures that any variations in the current effect all tubes simultaneously.

According to the present invention each optical system reproducing one particular colour component is provided with a supporting cradle arrangement which is adjustable in two directions whilst maintaining the centre of the optical system at the correct distance from the viewing screen utilised in the projection.

After the raster has been centred on the tube the picture elements of the various colours are accurately brought into registration. Once registration has been attained and mechanical clamps applied and the whole system set up the registration will remain substantially constant.

In order that the invention may be more clearly understood reference will now be made to the accompanying drawings which show one specific embodiment thereof by way of example only and in which.

Figure 1:
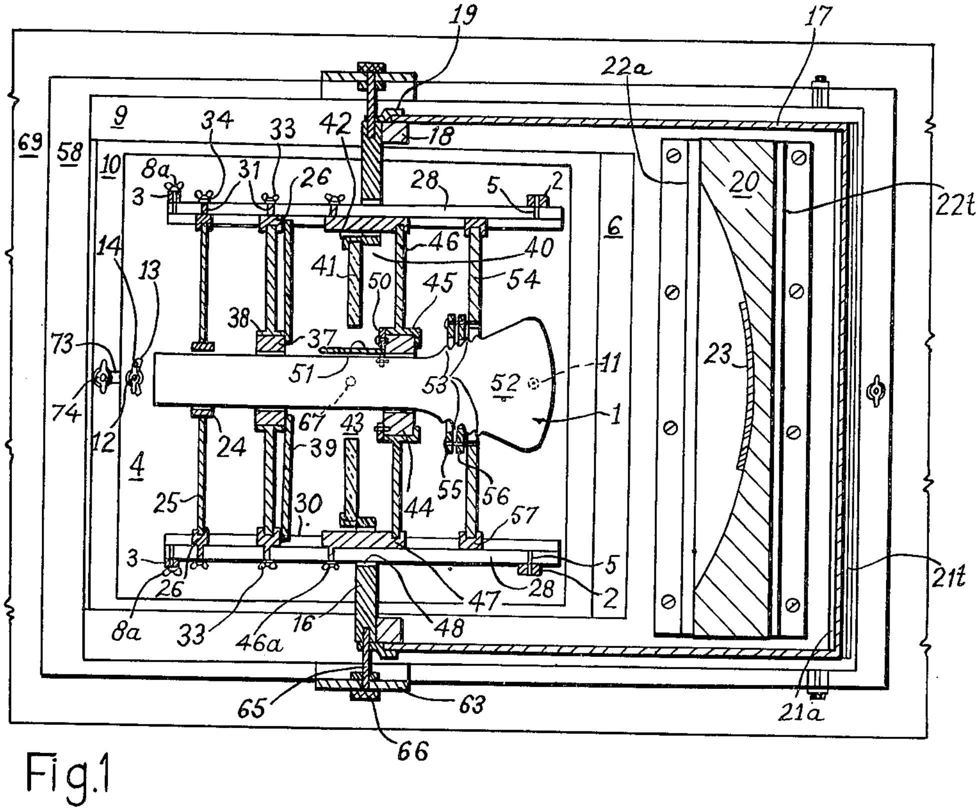
FIGURE 1 shows a plan view mainly in section of an optical arrangement of one only of the projectors along the line I—I of FIGURE 2.

In a three-colour projection system three projectors are arranged in any known or convenient manner so that the rasters projected by each may be superimposed on a single screen. Since three projector arrangements are in themselves well known the overall arrangement is not shown in the drawings since the invention relates to the optical arrangements for each individual projector.

Referring to the drawings therefore which show only one projector of the three necessary to project a television picture in colour, a cathode-ray tube 1 is mounted on spiders 54 and 25 which are held by tracks 28 which are in turn supported at the rear and front by stirrup members 2 and 3 respectively. These stirrups may take the form of substantially U-shaped members and are secured to a tube mounting base plate 4 in any desired fashion e.g. by screws. At the screen end of the cathode-ray tube 1, and in line with the centre of the screen, two laterally-projecting pivot pins 5 are provided which pass through the arms of the front stirrup 2 and the tracks 28. As in conventional engineering practice a movement-damping member such as a spring washer may be associated with the pivot pins 5.

A similar arrangement is provided for the base end of the tube, the stirrup 3 also being U-shaped but having slots 7 through which mounting pins 8 project, the slot allowing for a degree of pivotal movement about the pivots 5 and the clamping screw 8*a* being screwed down to secure the tube assembly in its position of adjustment.

The tube mounting plate 4 is pivoted to a focussing base plate 10 by means of the pivot 11 so that the plate 4 may be moved in a horizontal plane about pivot 11 to adjust the angular position of the tube assembly. The focussing plate 10 has a screw 12 projecting upwardly therefrom which passes through an arcuate slot 13 in the tube mounting plate 4 and the latter may be clamped in position by tightening a nut 14 located on the outside of the base plate 4. A spring washer 15 may be provided between the nut 14 and the plate 4 in accordance with conventional practice.

A vertical mounting plate 16 is secured to an optical system base plate 9 in any desired fashion so as to project upwardly therefrom and this plate 16 forms the front end of a light tight box 17 that comprises a top, two sides and a rear, the box 17 being located on a support 18 secured to the plate 16 and engaging under a locking flange 19 secured to the support 18 at the top end and sides and between a flange 21*a* and a fillet 21*b* secured to the base plate 9 at its bottom end. It will be apparent that the leading i.e. front and side upper edges of the part 17 engage under the flange 19 and the rear bottom edge of the part 17 locates between the flange 21*a* and the fillet 21*b*. The vertical mounting plate 16 and the box 17 are made from metal of stout gauge so that they may act as an X-ray radiation shield since the voltages of operation of the tube 1 for use in projection television are generally extremely high. The box also, of course, excludes light and is preferably wholly lead-lined except for the exit pupil, and a slot at the base of plate 16, through which slot pass the bases 4 and 10. The board 10 is slidable along a recess 6 in the base plate 9.

A spherical mirror 20 is also mounted on the base plate 9 by means of brackets 22*a* and 22*b* which include provision for aligning the mirror with respect to the corrector plate, and in the centre of the spherical mirror 20 there may be provided a rectangular contrast-improving mask 23 of opaque material or alternatively the mask 23 may be formed by making an aperture in the spherical mirror. The shape of the mask 23 may be rectangular. Towards the base end of the tube 1 there is provided a mounting collar 24 attached to a spider 25 which is secured by its ends to the tracks 28.

Further along the neck of the tube 1 there is provided a focus coil 37 which is loose around the tube neck and is mounted in a collar 38 attached to a flexible spider 39 at the rear, i.e. at the side nearer the tube screen. The spider 39 is provided with slide members 26 running in the tracks 28 and is clampable in position by screws 33. Provision is also preferably made for tilting the coil 37 about the tube face end of the coil and clamping it in position by a suitable clamp associated with the collar 38 which is secured to a rigid spider 38*a*, which is also attached to the sliders 26.

The rear mounting plate 16 has a large aperture or exit pupil 40 in front of which is mounted a corrector plate 41 of glass or other suitable transparent material in suitable mounting clamps 42. The corrector plate has an aperture 43 through which the neck of the tube 1 passes.

Figure 2:
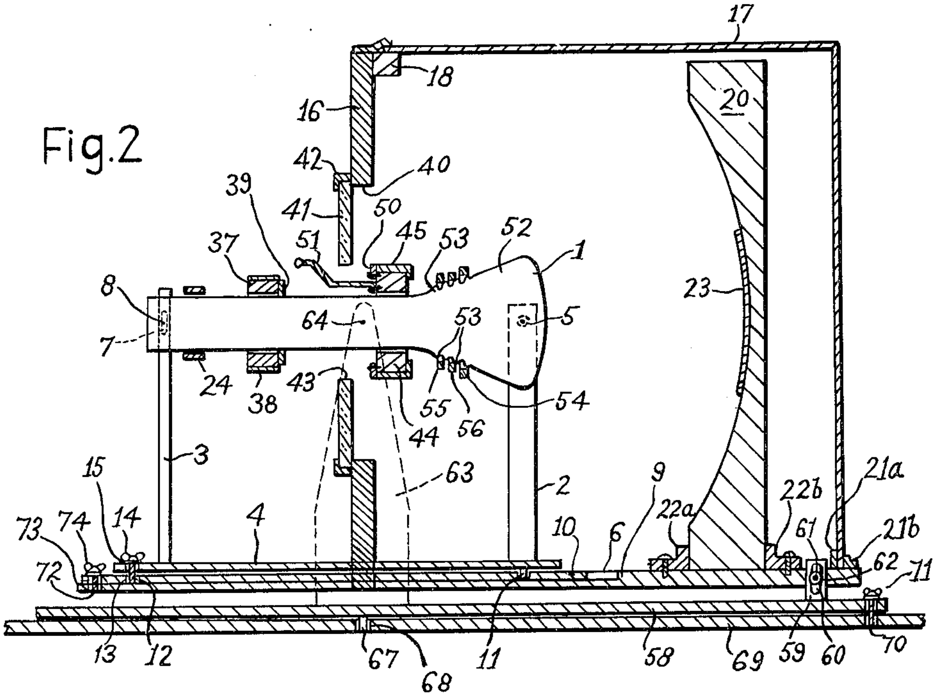
FIGURE 2 shows a side view mainly in section of the arrangement of FIGURE 1 along the line II—II of that figure.
Figure 3:
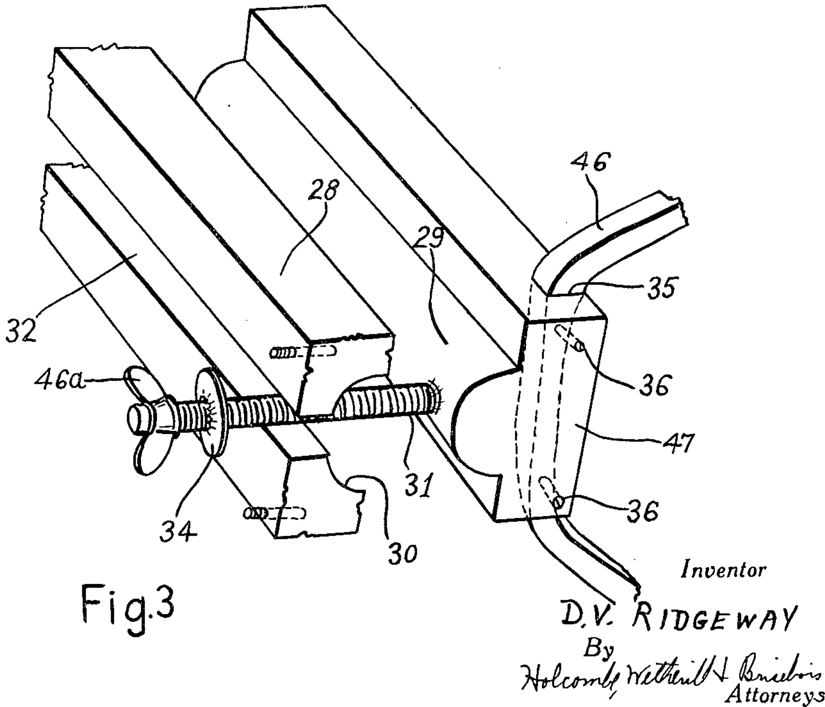
FIGURE 3 shows a detail of one slide member and its associated track member.

Inside the box 17 a deflection coil 44 is provided which is loosely mounted around the neck of the tube in a collar 45 attached to a spider 46 that also is provided with a slide member 47 similar to the slide member 26 except that it extends in a forward direction. The track members 28 pass through apertures 48 one on each side of the vertical mounting plate 16. Thus the position of the spider 46 and the deflection coil 44 can be adjusted from outside the light tight box by slackening off and subsequently retightening the nuts 46*a*, the arrangement being similar in other respects to the clamping arrangement 33. The coil 44 is rotatably mounted within the collar 45, collar 45 being shaped as shown and having a cover ring 50 to locate the coil in position. The ring 50 may be secured to the collar 45 in any desired manner, e.g. by screws. Projecting forwardly from the coil 44 is a hand lever 51 which passes through the aperture 43 in the corrector plate whereby the handle 51 may be moved from outside the light tight casing so as to rotate the coil 44 about the longitudinal axis of the tube so as to obtain correct angular registration. All the parts associated with the deflector coil mounting must be of insulating material as must be the tube face end of the focus coil mounting so as to avoid any magnetic interference which would be set up due to eddy currents in nearby metallic parts. A detail of the slide members 47 is shown in FIGURE 3 in association with one of the tracks 28. The slide members 47 each have a projecting portion 29 which engages in a runnel 30 in the slide member 28 and each slide 47 has a projecting screw 31 passing through a slot 32 and having a nut 46*a* and a movement-damping washer 34 located around it whereby the member 47 can be secured in position relative to the track 28 by tightening the screws 33, one on each side. FIGURE 3 also shows a fragmentary detail of the manner in which the spider 46 can be located in the slide member 47 by locating in a slot 35 in the member and secured in position therein by screws 36. FIGURE 3 is to a larger scale than FIGURES 1 and 2. All the movable spiders are clamped in an analogous manner.

The body 52 of the cathode-ray tube 1 is provided with corrugations 53 and these corrugations are used to clamp a further spider 54 by means of clamping rings 55 and 56 the spider 54 being terminated at its lateral ends by means of members 57 located permanently on the tracks 28.

The optical system base plate 9 is located over an azimuth base plate 58 which at its rear end is provided with a pair of vertically-extending brackets 59 slotted at 60 and a pin 61 secured to the edges of the base plate 9 passes through the slot 60 so that the base plate 9 can be secured in position relative to the azimuth base plate 58 by tightening adjusting nuts 62. A spring washer or the like may be provided around the pin 61 and between the nut 62 and the bracket 59 so as to damp the movement and effect a secure clamping action.

Secured to and projecting upwardly from the azimuth base plate 58 is a stirrup member 63 which may be U-shaped and secured to the upper surface of the base plate 58 or alternatively may be in the form of brackets secured to the side edges of the base plate 58. The two side limbs of the stirrup 63 are each provided at their upper ends with apertures 64 and two pivot pins 65 projecting one on each side from the vertical mounting plate 16 pass through the apertures 64 and clamping nuts 66 may be provided to lock the parts in position at the pivot. Thus the whole box 17 may be pivoted with its base plate 9 about the pivots 65 and therefore a small space is left between the base plates 9 and 58 to allow for this movement and the slot 60 in the bracket 59 is elongated for a similar purpose.

The pivot pins 65 are located as near as possible in the plane of the corrector plate 41 which defines the optical centre of the whole projector. Thus the casing 17 may be pivoted about the optical centre of the projector.

The azimuth base plate 58 has a pivot 67 locating in an aperture 68 in a main base support 69. The main base support 69 has a pin 70 projecting upwardly through an arcuate aperture in the plate 58 and is provided with an adjusting nut 71 so that the plate 58 may be clamped in relation to the main base support 69. The optical system base plate 9 is also provided with an upwardly extending pin 72 passing through a slot 73 in the focussing base plate 10 whereby the base plate 10 can be secured in relation to the base plate 9 by means of the adjusting nut 74.

In the arrangement shown the tube face diameter may be 12.7 cm., the radius of curvature of the mirror 20, 40 cm., the centre of the tube face 20 cm. from the mirror 20 and the optical centre defined by the pivot pin 65, 20 cm. from the tube face. The exit pupil may be 28 cm. in diameter. A projector with these dimensions has worked well in practice.

Figure 4:
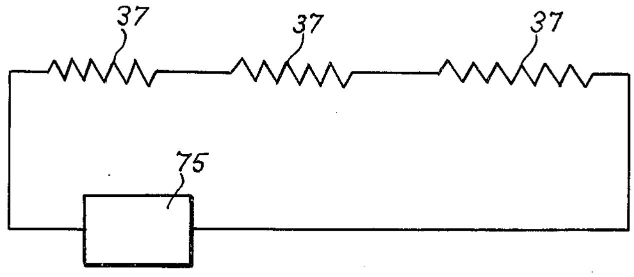
FIGURE 4 shows an electrical circuit detail.

Referring now to FIGURE 4, the focus coils 37 for the three projectors, one of which only has been referred to in detail, are connected in series and supplied with current from a controlled and stabilised source schematically shown at 75, so that the current through all the coils can be varied simultaneously.

The three deflection coil assemblies 44 are similarly connected in series the arrangement being substantially the same as that shown in FIGURE 4. In this case the three line windings are connected in series to the line time base and the three frame windings are connected in series to the frame time base.

In order to set up the optical system previously described, the reflecting spherical mirror 20 and the refracting corrector plate 41 are set up mechanically in correct relationship with each other.

When it is desired to align the various colours on the screen (which is not shown in the drawings), so that the colours are in accurate registration, the following procedure is adopted.

(1) Firstly rasters are produced in all three tubes and the raster in the tube producing the green colour is electrically focussed by means of a main (absolute) focus control. The focus of the tubes for the red and blue colours is then adjusted by sliding the focus coils 47 along the necks of these two tubes by the adjustments provided which incidentally form the relative focus controls.

(2) A small black spot is painted on the centre of the surface of the tube face and this spot will become evident when the raster is produced and the image of the spot is projected and focussed on to the screen by sliding the focus plate 10 on plate 9. The light tight boxes 17 are then suitably orientated about the centres of the corrector plates by means of the various adjustments provided so that the black spot on each tube appears at the centre of the screen, and the three spots are made coincident. By adjusting the boxes about the centres of their corrector plates, the axial optical magnification is not affected.

(3) The focus board is then slid on plate 9 in order to bring the rasters behind the black spots into focus again on the viewing screen. Then by pivoting the tube assembly about pivots 5 and 11 in each of the tubes separately, overall optical focus is then adjusted.

(4) The three rasters are then centred on the three tube faces by means of the adjustments provided for the focus coils 37. Any apparent inclination of the raster away from the horizontal and vertical is corrected by rotating the deflection coil 44 by means of the hande 51.

(5) The raster is then changed for a pattern usually consisting of something like a checker-board and the relative amplitudes of these three patterns on the screen are matched by axial movement of the deflection coil assemblies 44 for each colour which form the relative amplitude controls.

By using the checker-board pattern the precise registration of the various elements of the picture is made more easy throughout the whole area of the screen, and the final registration adjustments are made by accurately orientating the "red" and "blue" boxes 17 about the centres of their corrector plates with respect to "green" to give precise registration.

Since all the deflection coils 44 are connected in series and since all the focus coils are similarly connected, any current variations effect each colour tube simultaneously and so do not alter registration. Controls are provided for absolute adjustment of the three coloured images.

The mounting flanges **22*a* and 22*b* are part of a removable framework which houses the spherical mirror 20**. This framework has to be removed in order to change the cathode ray tube. When the framework is replaced it is arranged to return to its original position to avoid the necessity of further adjustment. However, in the first instance, it is necessary for the mirror to be correctly aligned in a suitable manner within the framework and locked in this position, so as to be in the correct position with respect to the corrector plate. Such alignment is carried out by tilting the mirror about its pole in a manner known to those skilled in the art. Since many arrangements for performing this type of alignment are well-known they have not been illustrated so as to avoid over-complication of the drawing.

It will be appreciated that the arrangements shown are largely schematic and shown in this way purely for convenience in illustration and that modifications can be made to specific details shown as found convenient or desirable for the system in use. In particular it is stressed that the parts are not shown to scale and the relative locations also are not to scale. Similarly many variations are possible to the arrangements shown without in any way departing from the scope of the invention.

I claim:

1. In color television apparatus of the type comprising three optical systems, each including a cathode ray tube, focus and deflection coils located about the neck of said tube, a spherical mirror located to receive light from said tube, and a corrector plate encircling said tube, said plate being located in the path of light rays reflected from said spherical mirror and defining the optical center of the system, and the position of said mirror being adjustable with respect to that of the corrector plate, the improvement which comprises in combination a separate optical system base plate carrying each optical system, pivot means for each optical system base plate occupying a fixed position relative to the corrector plate of said system and on which said optical system base plate is carried for pivotal adjustment about two relatively perpendicular axes passing through the optical center of said system, means for adjusting the position of each tube both axially and pivotally relative to the associated corrector plate and spherical mirror, means electrically connecting the focus coils of all three systems in series, means connecting the deflecting coils of all three systems in series, and mechanical means for independently adjusting the image focus and amplitude of each tube by independently adjusting the positions of said coils longitudinally of their respective tubes.

2. In an optical system for color television apparatus as claimed in claim 1, a substantially light-tight box mounted on said optical system base plate so as to enclose the screen of said cathode ray tube and said spherical mirror, said mechanical means for adjusting the image focus and amplitude of said cathode ray tube being operable from outside said box.

3. In color television apparatus of the type comprising three optical systems, each including a cathode ray tube, focus and deflection coils located about the neck of said tube, a spherical mirror located to receive light from said tube, and a corrector plate encircling said tube, said plate being located in the path of light rays reflected from said spherical mirror and defining the optical center of the system, and the position of said mirror being adjustable with respect to that of the corrector plate, the improvement which comprises in combination a separate optical system base plate carrying each optical system, pivot means for each optical system base plate occupying a fixed position relative to the corrector plate of said system and on which said optical system base plate is carried for pivotal adjustment about two relatively perpendicular axes passing through the optical center of said system, means for adjusting the position of each tube both axially and pivotally relative to the associated corrector plate and spherical mirror, means electrically connecting the focus coils of all three systems in series, means connecting the deflecting coils of all three systems in series, means for controlling the common current through said focus coils and the common current through said deflecting coils, and mechanical means for independently adjusting the image focus and amplitude of each tube by independently adjusting the positions of said coils longitudinally of their respective tubes.

References Cited in the file of this patent

UNITED STATES PATENTS

| | | |
|---|---|---|
| 2,424,513 | Stephan | July 22, 1947 |
| 2,467,185 | Cady | Apr. 12, 1949 |
| 2,549,978 | Kuperus et al. | Apr. 24, 1951 |
| 2,567,745 | Trad | Sept. 11, 1951 |
| 2,571,233 | Groenenberg | Oct. 16, 1951 |
| 2,752,419 | Bailey | June 26, 1956 |
| 2,793,247 | Loughren | May 21, 1957 |

OTHER REFERENCES

Philco Service-Television-Philco Projection Television Receiver, Model 48–2500; Philco PR–1444; copyright 1947 (page 39 cited).

RCA, page 7–82 of Rider's Television Manual, vol. 7, copyrighted 1951. (Copy in Scientific Library.)